United States Patent [19]
Hughes

[11] Patent Number: 5,022,067
[45] Date of Patent: Jun. 4, 1991

[54] TELEPHONE CALL SECURITY SYSTEM

[75] Inventor: Fred P. Hughes, Trumbull, Conn.

[73] Assignee: Millicom Incorporated, New York, N.Y.

[21] Appl. No.: 512,112

[22] Filed: Apr. 20, 1990

[51] Int. Cl.$^5$ .............................................. H04M 11/00
[52] U.S. Cl. ...................................... 379/95; 379/200
[58] Field of Search ................. 379/200, 95, 201, 132, 379/188, 199, 249, 142, 143

[56] References Cited

U.S. PATENT DOCUMENTS

| | | | |
|---|---|---|---|
| 4,198,545 | 4/1980 | Haist et al. | 379/200 |
| 4,698,840 | 10/1987 | Dively et al. | 379/132 |
| 4,759,056 | 7/1988 | Akiyama | 379/142 |
| 4,893,325 | 1/1990 | Pankonen et al. | 379/142 |
| 4,947,422 | 8/1990 | Smith et al. | 379/200 |

OTHER PUBLICATIONS

Telephony Magazine, Nov. 14, 1988, "ANI is the Key to Unlock Advanced Network Services", pp. 64-68.
Sound & Communications, May 1984, Telecommunications, pp. 9-13.

Primary Examiner—Jin F. Ng
Assistant Examiner—Ahmad F. Matar
Attorney, Agent, or Firm—Bacon & Thomas

[57] ABSTRACT

A telephone call security system uses a long distance carrier access switch to prevent unauthorized access to the carrier by causing the switch control system to request a telephone identification serial number from the telephone and deny access if the serial number is not valid or if the number dialed is not an authorized number for the telephone whose serial number has been received. In addition, the system uses a coded query/response dialogue between the telephone and the switch control system for added security. The system may be implemented by modifying the carrier access switch control software and also includes a unique telephone and telephone resident control software.

45 Claims, 5 Drawing Sheets

TELEPHONE CALL SECURITY SYSTEM

BACKGROUND OF THE INVENTION

1. Field of the Invention

The present invention relates to a telephone communication system, and in particular to an apparatus and method for preventing unauthorized access to a long distance carrier.

2. Description of Related Art

The telephone call security system of the invention takes advantage of a local telephone company's ability to completely block default access to a long distance carrier's direct dial network or operator service. Long distance carrier access is commonly routed through an access switch controlled by a computer which operates the switch to permit or deny access to the carrier system. However, a problem has arisen in that it is possible to gain unauthorized access through the use of wiretaps or illegal telephone extensions.

While it is possible to limit an authorized telephone to a list of permitted telephone numbers by using telephone hardware and software alone, telephone-resident security systems may be by-passed by simply placing the wiretap or unauthorized extension downstream of the authorized telephone on the local telephone line. The present system therefore operates at the system level, and in particular at the long distance carrier access switch.

Recently, telephone systems have been implemented which, when a telephone call is made from a restricted access telephone such as a pay phone to the access switch control system, have the capability of analyzing the telephone number dialed, sending rate information to the telephone, and controlling access based on a signal from the telephone that sufficient money has been deposited into escrow for the call.

Such dialogues between the telephone and the switch control system commonly make use of the Dual Tone MultiFrequency (DTMF) system of tones, in which each tone or sequence of tones is assigned a specific meaning. This is the type of system used by most "touch tone" telephones.

Despite the sophisticated hardware and software used in such access systems, however, they can nevertheless be defeated by either tampering with the telephone or placing a wire tap or unauthorized extension on the telephone line, as noted above. Because the conventional DTMF "dialogue" can be relatively easily duplicated, it is often impossible for a conventional switch control system to determine whether a request for access to the long distance carrier originates from an authorized telephone. Losses resulting from fraudulent access continue to be a significant problem for long distance carriers.

SUMMARY OF THE INVENTION

It is an object of the invention to provide an apparatus and method which overcomes the drawbacks of the prior art by providing means for the telephone to identify itself and means for verifying the identification before permitting access to a restricted access carrier.

It is a further object of the invention to provide an additional security procedure in the form of a coded query/response dialogue between the telephone and the switch control system.

These objects are achieved by providing a system which includes telephone resident hardware and control software for generating telephone identification and destination number tones, and for generating a response to a coded query from the central control switch.

The system also includes central switch control system resident hardware and software which, if the identification number or the response to the coded query is not verified, concludes that the telephone call is unauthorized and prevents access to the long distance carrier.

The security system of the invention may be added to an existing system without major modifications by replacing existing telephones and by modifying the central switch control system software. In an especially advantageous embodiment of the invention, the carrier access control switch itself need not be modified at all.

The unique telephone for use in the preferred security system includes a microprocessor and corresponding software for conducting the security dialogue with the central control switch.

In addition to conducting a security dialogue, the system of the preferred embodiment also controls normal pay phone operations such as coin collection, speech path control, and rate related tasks.

DESCRIPTION OF THE PREFERRED EMBODIMENT

Figure 1:
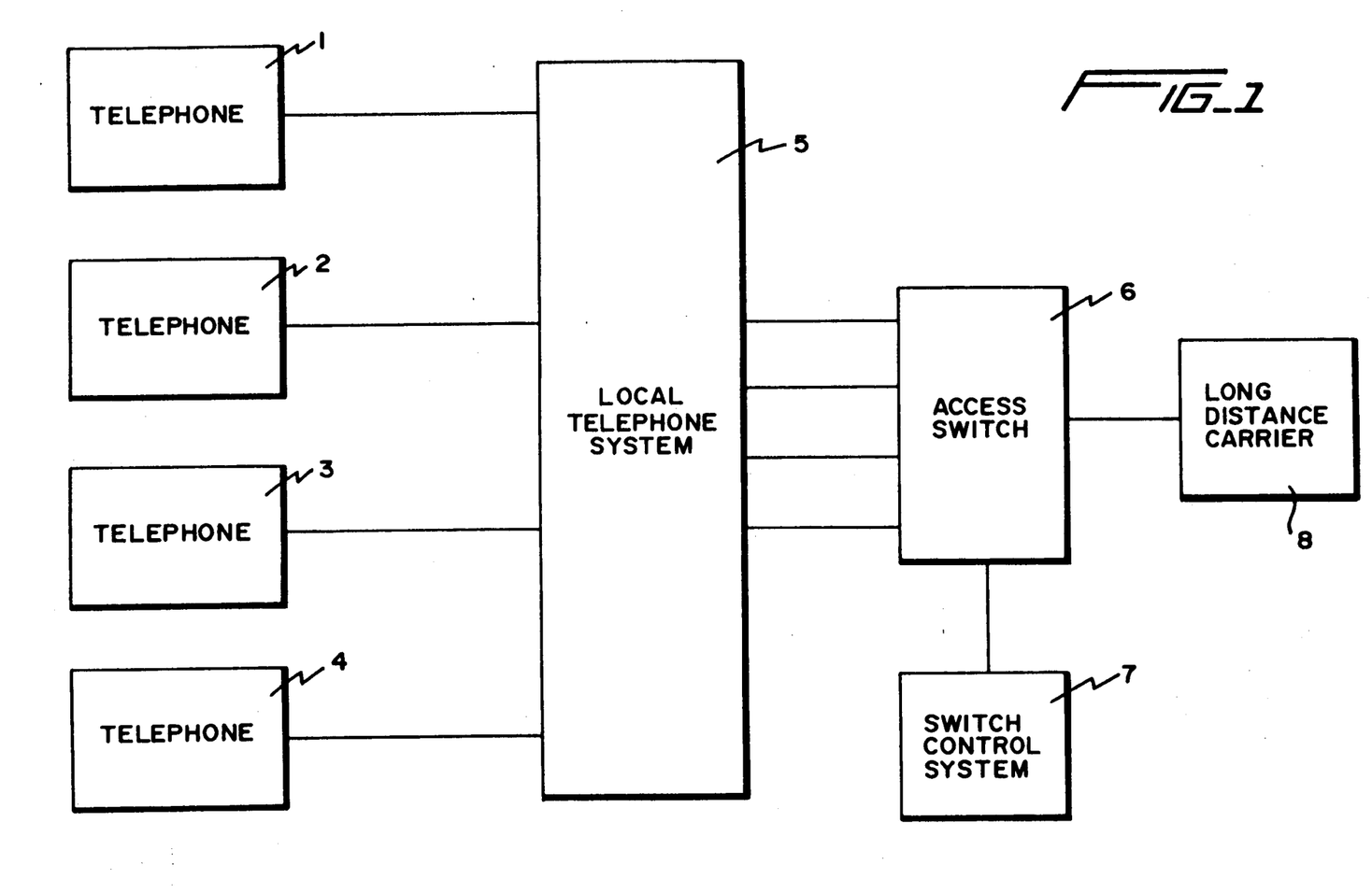
FIG. 1 is a block diagram illustrating the manner in which calls are routed to a long distance carrier.

FIG. 1 is a block diagram showing a telephone network including a long distance carrier access switch. Telephones 1-4 are connected to a local telephone system central office 5 where calls are routed according to the number dialed. A long distance carrier access control switch 6 is located either at the central office of the local telephone system, or at a number accessible on a toll-free basis. It will be appreciated that "longdistance" carrier 8 includes any restricted access telephone carrier, including those which also operate at a local level on an authorized use or toll basis.

Switch 6 routes calls to the carrier 8 under the control of switch control system 7, which includes a CPU controller, memory, and an input device by which the controller can be programmed to operate the switch. The controller typically also includes circuits for receiving Dual Tone Multi-Frequency (DTMF) tones and decoding them, and a tone generator for sending the tones.

A preferred switch and controller configuration is the SDS 2000 digital voice matrix switch sold by Summa Four, Inc. This switch is presently in service and includes a switch control system corresponding to system 7 which is arranged to code and send DTMF signals to, and to receive and decode DTMF signals from any telephones which possess corresponding capabilities.

The switch control system includes an external computer which operates the Summa Four switch to control access to the long distance network based upon the received DTMF signals. In order to minimize installation costs, the present invention is designed to utilize the Summa Four switch without modification, except to the control software of the switch control system. The Summa Four switch control system is arranged to be modified using conventional computer data entry equipment such as the AST 386 PC, SUN SPARK WORKSTATION, or DEC WORKSTATION 3100.

Other suitable programmable switches may also be available for controlling access to a long distance carrier from a local telephone system network, and which have the capability of sending and receiving DTMF signals and decoding them. Thus, it is intended that the telephone call security system of the preferred embodiment not be limited to a particular switch and switch control system hardware.

In addition, it is also within the scope of the invention that certain control functions may be expressed as hardware, for example, circuitry rather than software, insofar as such variations would be within the capabilities of those skilled in the art.

Figure 2:
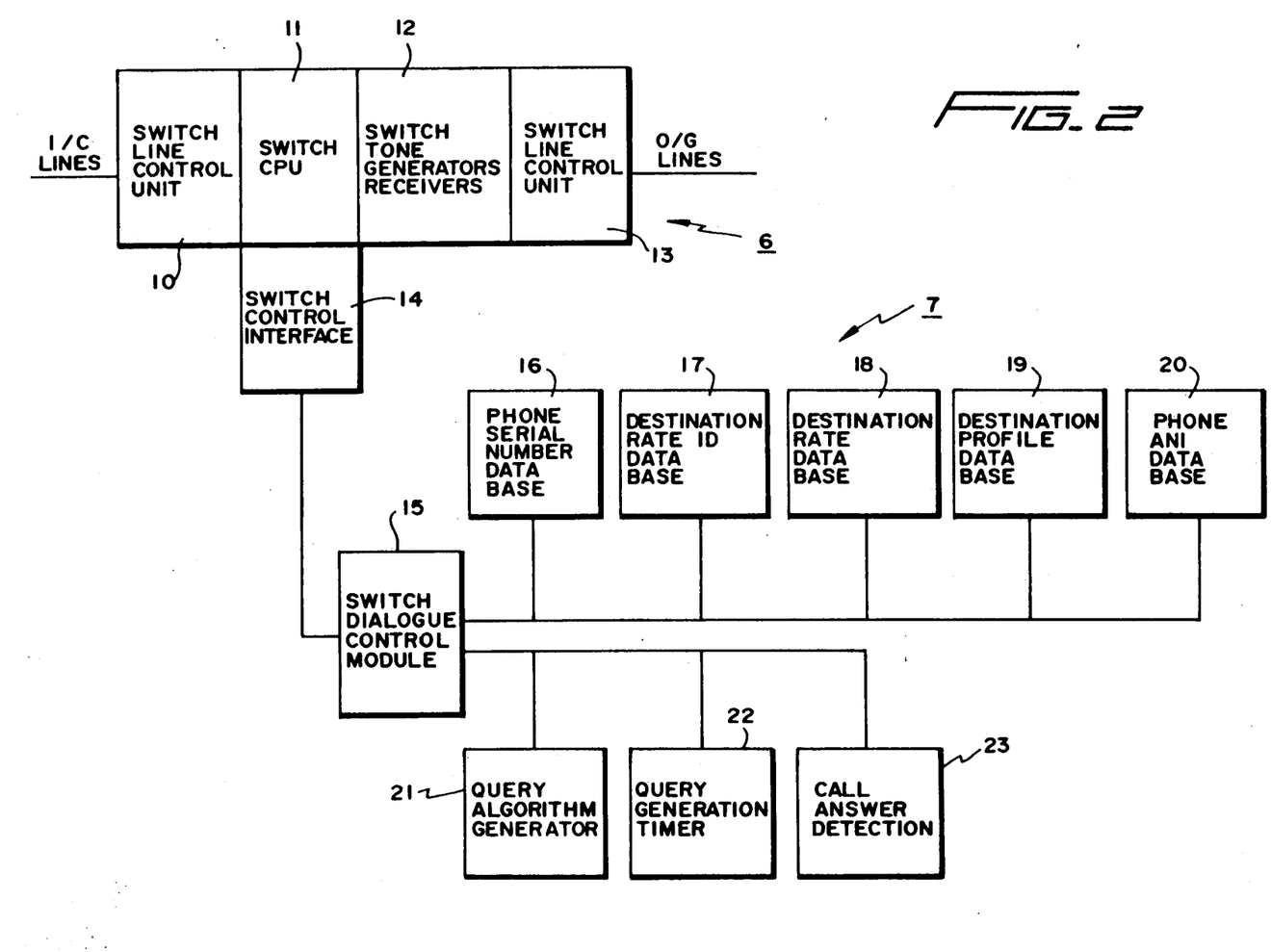
FIG. 2 is a block diagram of a long distance carrier access switch control system suitable for use with the telephone call security system of the invention.

As shown in FIG. 2, the control switch 6 includes a switch line control unit 10 which controls the incoming (I/C) lines, a switch CPU 11, switch tone generators and receivers 12, and outgoing (O/G) switch line control unit 13. Control instructions are routed to the switch CPU through a switch control interface 14. Each of these components is known to those skilled in the art and is included in the above-mentioned Summa Four switch.

Also shown in FIG. 2 is a preferred arrangement of the switch control system 7 software, including a phone serial number data base 16, a destination rate ID data base 17, a destination rate data base 18, a destination profile data base 19 and, optionally, a phone automatic number identification (ANI) data base 20. These data bases may be stored in any form of mass memory storage, including floppy and hard discs, magnetic discs, and optical discs.

The switch control system 7 is also set up to include a switch dialogue control module 15 which controls access to the respective data bases and is part of the switch control system computer. In addition, the computer includes a query algorithm generator 21, a query generation timer 22, and a call answer detection module 23. Each of these elements may be implemented in the form of computer software, to be described below, or as computer hardware components.

Figure 3:
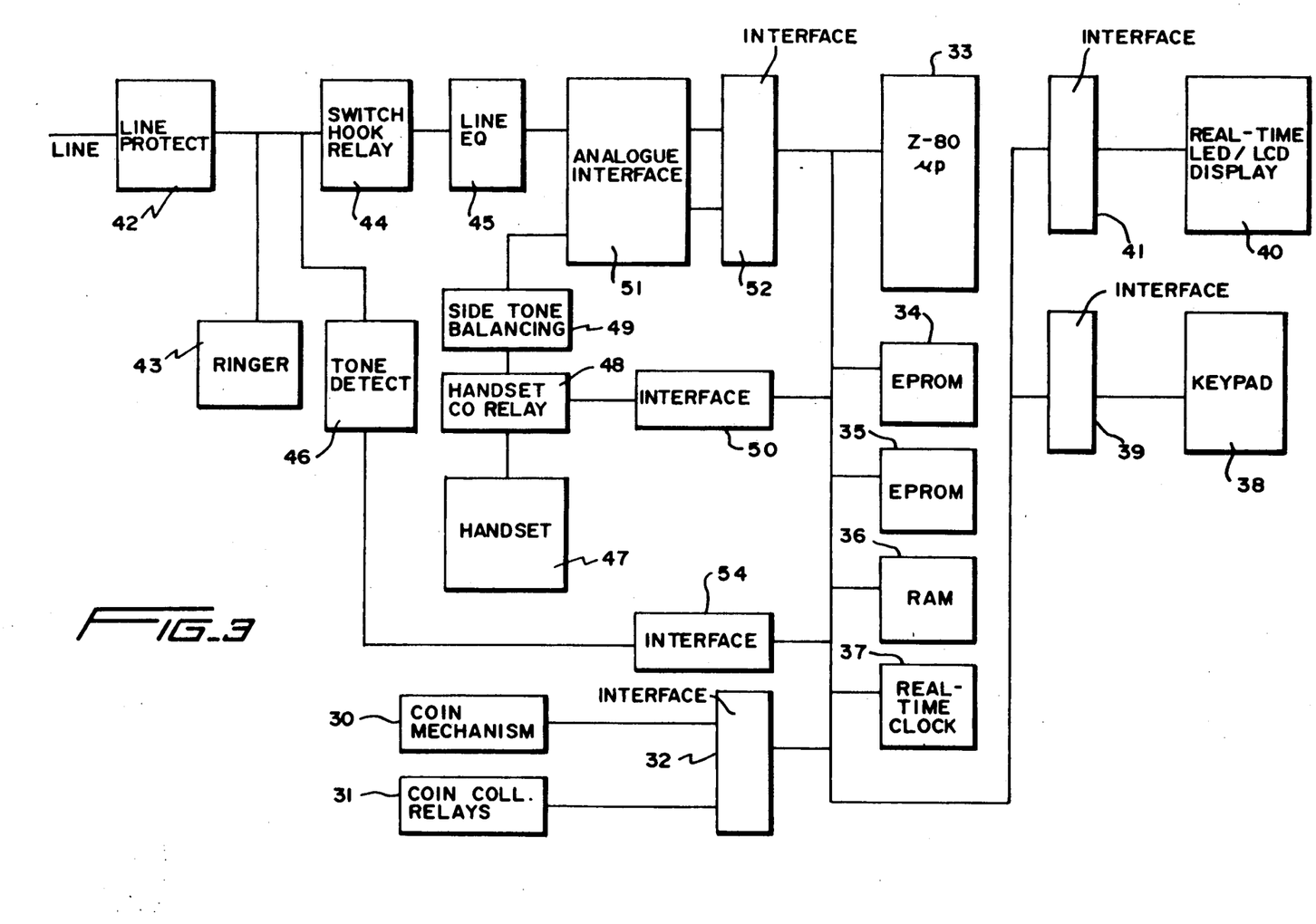
FIG. 3 is a block diagram of a coin operated telephone according to a preferred embodiment of the invention.

FIG. 3 is a block diagram of one of telephones 1-4 shown in FIG. 1. The telephone is a pay phone and includes coin mechanism 30 and coin collection relay 31, which are connected to a central processing unit (CPU) via an interface 32.

It will be appreciated that telephones 1-4 need not necessarily be coin operated pay phones, but could also include a credit card reader device or be operated via a password, the password enabling selective users to call specified numbers. The phones could also be operated on a carrier credit account basis, or by debiting an existing user account.

Interface 32 is connected to a common bus 53 which serves to transmit data and control signals between a microprocessor 33, electrically programmable memories (EPROMs) 34 and 35, and random access memory 36. A preferred microprocessor is the Z-80 microprocessor, although other microprocessors may be substituted based on such factors as memory requirements and cost.

In addition to data, bus 53 transmits clock signals generated by a real-time clock 37. Also included in the preferred telephone is an interface 50 connected to handset 47 via a handset cutoff relay for generating a signal indicative of whether the handset is on or off the hook, and an interface 52 which is connected to a analog interface 51 for routing voice signals from the line to the handset and vice versa.

Analog interface 51 is connected to the handset via a side tone balancing circuit as is well known in the art, and to the telephone line via line protect 42, switch hook relay 44 and line equalization circuit 45. Switch hook relay 44 cuts off the telephone from the line when the handset is on the hook, and line equalization 45 provides signal balancing to comply with Federal Communications Commission requirements.

Also included is a conventional ringer 43 and tone detection circuit 46 connected to the common bus 53 via an interface 54. Finally, the pay telephone includes a display 40, for example an LED or LCD display, and a key pad 38 by which numbers and information may be entered into the telephone through an interface 39.

Each of the individual components shown in the block diagram is a commercially available component of a type well known to those skilled in the art and therefore will not be described in greater detail. The control program of the invention is stored in EPROM 34, although other forms of program storage may be substituted, for example ROM cartridges or cards. RAM 36 is used to temporarily store data during program execution, as is well known in the art, while EPROM 35 may be used to store tables of rates and other information needed for program execution.

Figure 4:
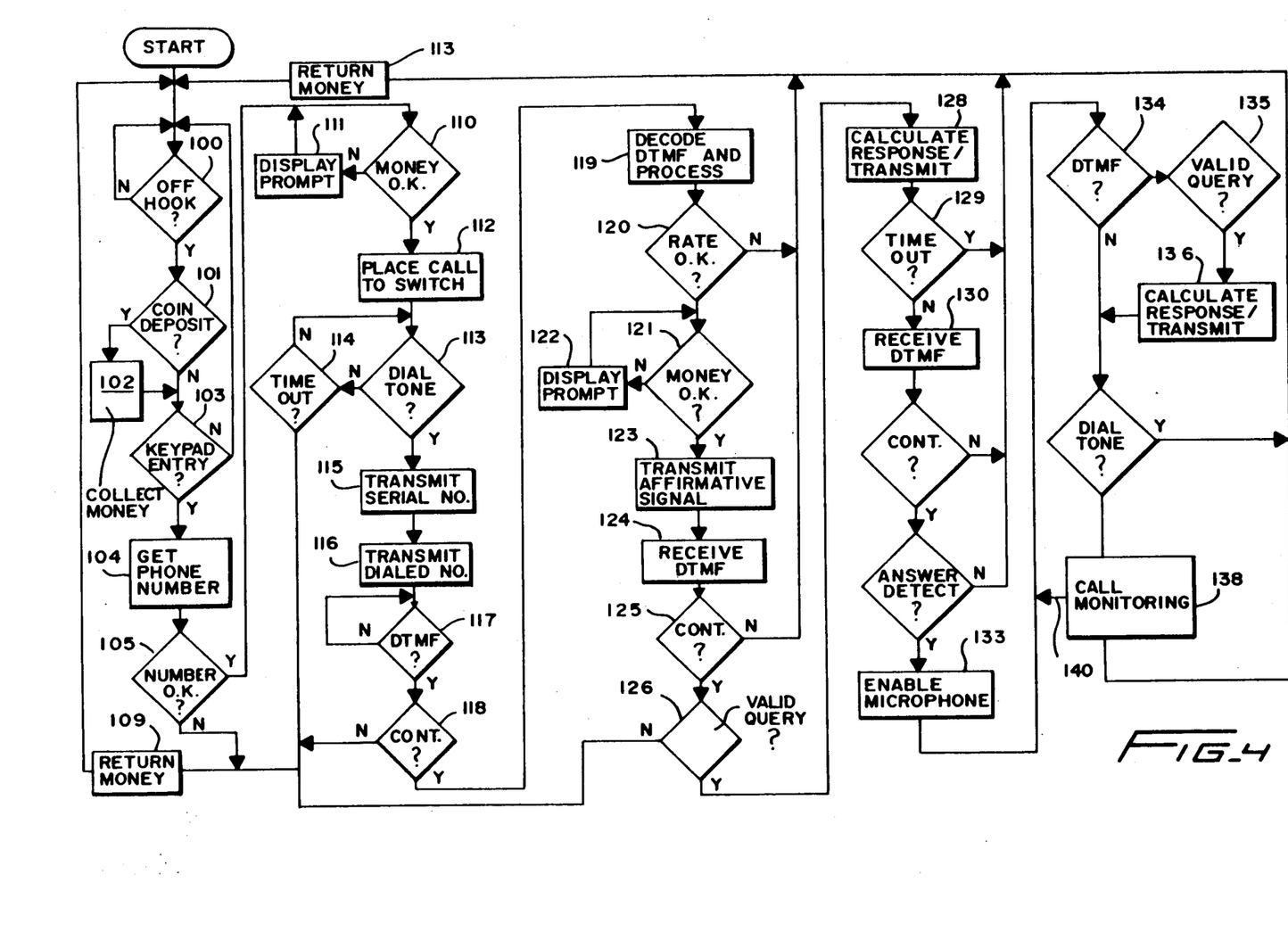
FIG. 4 is a flow chart of a preferred control sequence for the telephone of FIG. 3.
Figure 5:
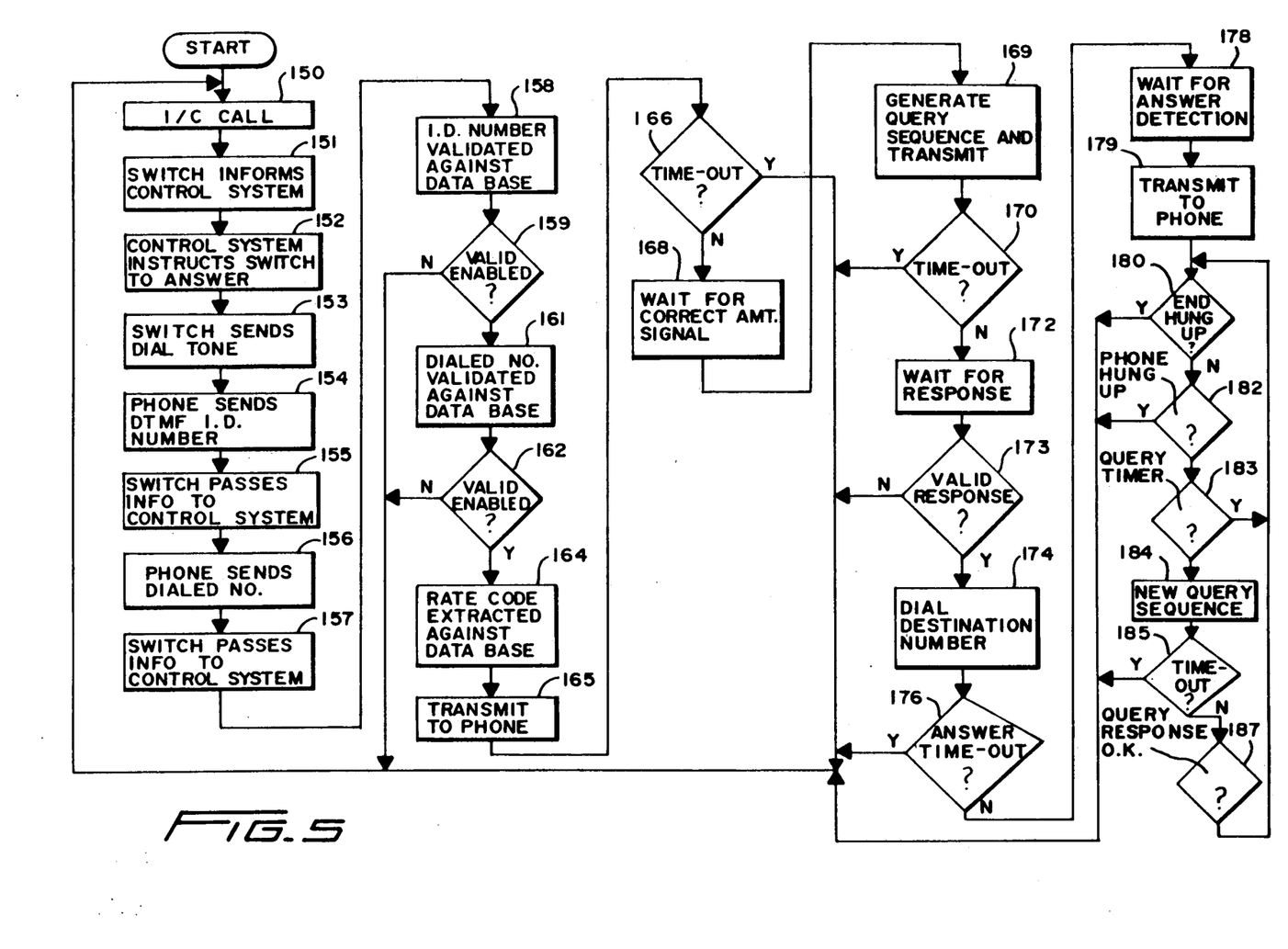
FIG. 5 is a flow chart of a preferred control sequence for the switch control system of FIG. 2.

FIGS. 4 and 5 are flowcharts showing, respectively, the telephone and access switch control system operating sequences. The sequences are preferably implemented by software in combination with the hardware of FIGS. 1-3, but also may be implemented using dedicated circuitry. The individual program routines which make up the preferred software, utilize ordinary tone generation and decoding subroutines, and are well within the capability of those skilled in the art.

Referring initially to FIG. 4, the telephone call security system is activated when a customer lifts handset 47 off its hook, causing a signal to be transmitted through interface 50 which begins program execution by microprocessor 33.

Upon recognition of an off hook condition, as indicated by step 100 in the flowchart of FIG. 4, the pay phone begins a coin collection sequence including steps 101 and 102. Initially, the phone determines whether coins have been deposited in coin mechanism 30 (step 101) and counts and collects the coins collected (102).

Upon entry of a number via keypad 38, the pay phone determines at step 105 whether the number is allowed, for example by comparing the most significant digits of the number with corresponding numbers stored in EPROMs 34 or 35, or by simply counting whether sufficient digits have been dialed. If the number is incorrectly dialed or not authorized from the telephone, the controller causes any coins already deposited to be returned and the call dropped (step 109). At this time the telephone control program returns to its initial position on the flowchart.

If the number is correct and initially determined to be authorized, the telephone controller then determines whether the required coins have been inserted yet (step 110) and prompts the caller for more coins if the amount is insufficient.

If the initial amount is correct, the telephone places a call to switch 6 (step 112). As illustrated in FIG. 5, the call is received by switch 6 (step 150) and a message is sent to switch control system 7 that the incoming call has been received (step 151). At this time, a dial tone is sent to the telephone (steps 152 and 153).

Upon receipt of the dial tone by the telephone (step 113), the telephone transmits a telephone identification serial number, which should be independent of the telephone number, to the switch (step 115). A time-out routine 114 is provided which cause the call to be terminated if no dial tone is received within a specified time.

The serial number may be accompanied by a check digit for the purpose of enabling the control system to determine whether the serial number received is the same as what was intended to be sent.

Preferably, the serial number takes the form of a sequence of DTMF tones unique to the telephone in which they are generated. The phone also transmits in the form of DTMF tones the destination number and a terminator for indicating the end of the number to the switch (step 116).

Returning to FIG. 4, the control switch relays the DTMF tones received from the telephone to switch control system 7. Control system 7 then searches phone serial number data base 16 for the transmitted serial number. If the serial number is not found in the data base 16, the phone call is terminated as indicated by the "no" branch at box 159 of the flowchart.

When the call is terminated, a DTMF termination signal is sent to the telephone, and is interpreted by the telephone at step 118 as being a signal to discontinue the telephone call.

At this point, it will be appreciated that use of a unique serial number for each telephone prevents a wire tap from being placed on the line because the control switch will not permit access to the long distance carrier unless it receives a valid serial number which matches one of the serial numbers stored in its data base 16. Nevertheless, it is conceivable that generation of the serial number could be accomplished by an unauthorized telephone or wiretap, or that an unauthorized call could be made from an authorized telephone. Thus, additional security measures are provided for.

First, as indicated by steps 161 and 162, if the serial number is determined to be valid after processing in steps 158 and 159, the control switch checks the number dialed, and validates it against a data base of permitted numbers stored in database 19. If the number dialed is invalid, the control switch indicates to the telephone via an appropriate DTMF tone sequence that the number is invalid, and the telephone executes the money return sequence (step 109) while the control system returns to its initial state and prevents access to the long distance carrier.

If both the serial number and destination number are valid and authorized, the control system extracts a rate code for the destination from data bases 17 and 18 and transmits it to the telephone. It will be appreciated that modifications of the rate code sequence, for example to include a credit card verification sequence or a phone card debit sequence, may also be utilized with the invention.

In the preferred embodiment, the telephone responds to the rate information received and decoded in steps 117-119 by determining whether the rate is permitted (step 120) and by determining whether sufficient money has been collected (step 121). The caller is prompted to insert more money for the call if insufficient money for the call has been deposited into escrow (step 122).

Upon collection of the proper amount for the call, a DTMF signal is sent back to the control switch (step 123). The control switch includes a time out sequence (steps 166 and 168) which, if the correct amount has not been deposited within a predetermined period of time, cuts off the call.

At this point in the control sequence, the control system has verified that the call originated from a phone having a valid serial number, that the destination number is permitted from that telephone, and that the proper amount of coins have been deposited. The control system now initiates a coded query/response dialogue with the telephone.

The coded query/response sequence, steps 169-173 and 126-130, is accomplished by generating a coded sequence of DTMF tones (step 169) and transmitting the sequence, performing a calculation at the telephone according to a predetermined algorithm, and sending a reply signal based on the result of the algorithm to the control switch (step 128).

The coded sequence is preferably a random sequence of tones generated by a random number generator. After receiving the sequence (step 124), the telephone determines whether the tones received constitute a call termination signal (step 125) or a valid sequence (step 118), and then calculates a response. The calculation may take any form which results in a predictable response. For example, the query sequence may be reordered, or the tones may be operated on mathematically.

After waiting for a response (step 172) if the control system determines that the response is correct (step 173), then the control system at this time permits access to the long distance carrier. If the response is not correct, or is delayed, the call is terminated and the pay phone instructed to return any coins due the caller.

Control system 7 obtains access to the long distance carrier by instructing control switch 6 to dial the destination number on the outgoing line (step 174). The control system then waits for a DTMF signal on the outgoing line indicating that the call has been answered (step 176), at which time it sends a DTMF answer detection signal to the telephone.

Upon receipt of the answer detect signal, the telephone executes a standard call answer sequence 133 including enabling a microphone in handset 47 and routing voice signals through the analogue interface 52.

At the same time, the telephone monitors the progress of the call, terminating the call upon detecting a dial tone on the line, indicating that the distant party has hung up (step 137), and executing standard coin collection routines (138) at appropriate predetermined intervals until the call is completed and any excess money is returned.

The call monitoring routine 138 may also include a branch indicated by arrow 140 which permits the query/response routine to be repeated. As shown in FIG. 5, the control system executes a loop in which the query sequence is periodically generated and transmitted to the telephone. In response, the telephone, at step 134, periodically checks to see whether a DTMF query sequence has been received from the control system, validates the query (step 135), calculates a correct response and transmits it back to the control switch (step 135) which verifies the response (step 187).

In addition, the query/response sequence may be repeated upon failure by the control system to receive a valid reply.

The sequence according to which the telephone call security system of the preferred embodiment operates may be summarized as follows:

Initially, the user dials a requested number. The phone then determines that the number dialed is a valid non-local number and prompts the user to deposit an initial amount of coins into escrow. After the user deposits the initial amount, the phone places a local or toll-free call to the control switch.

The control switch, under control of the switch control system, enters the call and sends an identification serial number request to the phone. The phone responds with its identification serial number and the number dialed. The switch then determines whether the identification serial number and number dialed are valid, looks up correct rate information, and sends the rate information to the telephone.

After receiving the rate information, the telephone prompts the user to deposit more money if required, and signals to the switch when a correct amount of money is in escrow. The switch then begins a coded query/response routine by generating a random sequence of tones and transmitting them to the telephone. The telephone decodes the coded signal, calculates a reply, and sends the reply to the control switch, which determines whether the reply is valid and, if so, places a call to the destination.

After the switch calls the carrier passes a call answer or failure to answer signal to the switch, which then informs the telephone by an appropriate signal. If the call has been answered, the telephone enables a microphone and begins timing the call, during which the switch periodically sends varying poll query signals to the phone and validates the replies.

It will be appreciated that numerous variations of the invention are possible. For example, while DTMF tones are presently the preferred medium of communication between the telephone and the switch control system, these tones are audible to the caller and may therefore be disagreeable. Also, audible tones might be more easily recorded and decoded by a potential unauthorized user.

It is therefore contemplated that higher frequency tones could be used as a medium of communication, the tones either being of an inaudible frequency or of a frequency which is rejected by the telephone's analog interface and filtered out by the filtering and frequency response generation effects of the long distance networks.

It is likely that numerous other variations of the invention will occur to those skilled in the art, and it is therefore intended that the scope of the invention be limited solely by the appended claims.

I claim:

1. A telephone call security system, comprising:

a telephone including tone generation means for generating and transmitting tones representative of a telephone identification serial number when a telephone call is placed from the telephone; and a control switch device including means for permitting access from said telephone to a restricted access carrier, means for receiving said tones representative of a telephone identification serial number, and identification verification means verifying whether said identification number corresponds to the identification of a telephone from which access to the carrier is permitted;

wherein said control switch device further includes coded signal generation means for generating and transmitting to said telephone a coded sequence of tones subsequent to verification of said identification number, means for receiving from said telephone a reply in which said tones are modified in respect to said coded sequence of tones, and means for verifying whether said reply sequence of tones is valid.

2. A system as claimed in claim 1, wherein said verification means comprises an identification data base and means for comparing said identification number with telephone identification numbers stored in said data base.

3. A system as claimed in claim 2, wherein said control switch device further comprises means for transmitting rate information to said telephone upon verification that access is permitted.

4. A system as claimed in claim 3, wherein said telephone further comprises means for processing said rate information and means for prompting a customer to deposit an additional amount if necessary.

5. A system as claimed in claim 4, wherein said rate processing means includes means for generating a payment verification signal upon verifying that a sufficient amount has been deposited into escrow.

6. A system as claimed in claim 5, wherein said coded signal generation means includes means for generating and transmitting to said telephone said coded sequence of tones in response to receipt of said payment verification signal.

7. A system as claimed in claim 6, wherein said coded signal generating means comprises means for generating a random selection of tones.

8. A system as claimed in claim 6, wherein said telephone further comprises means for performing a calculation based on said coded sequence of tones and generating and transmitting said reply sequence of tones based on said calculation.

9. A system as claimed in claim 8, wherein said means for verifying whether said reply sequence of tones is valid comprises timer means for generating a signal representative of the passage of a predetermined time interval and means for disconnecting the telephone call if a valid reply sequence of tones is not received within said predetermined time interval.

10. A system as claimed in claim 9, wherein said control switch further comprises means for causing said coded signal generating means to periodically generate said coded sequence of tones and for causing said disconnection means to disconnect the telephone call if a valid response to a respective coded sequence of tones is not received within said predetermined time interval after the respective coded sequence of tones is generated.

11. A system as claimed in claim 9, wherein said control switch device further comprises means for completing the telephone call if said reply sequence of tones is valid.

12. A system as claimed in claim 1, wherein said coded signal generating means comprises means for generating a random selection of tones.

13. A system as claimed in claim 1, wherein said telephone further comprises means for performing a calculation based on said coded sequence of tones and generating said reply sequence of tones based on said calculation.

14. A system as claimed in claim 13, wherein said control switch further comprises timer means for generating a signal representative of the passage of a predetermined time interval, and means for disconnecting the telephone call if a valid reply sequence of tones is not received within said time interval.

15. A system as claimed in claim 14, wherein said control switch further comprises means for causing said coded signal generating means to periodically generate said coded sequence of tones and for causing said disconnection means to disconnect the telephone call if a valid response to a respective coded sequence of tones is not received within said predetermined time interval after the respective coded sequence of tones is generated.

16. A system as claimed in claim 14, wherein said control switch device further comprises means for completing the telephone call if said reply sequence of tones is valid.

17. A system as claimed in claim 1, wherein said control switch device further comprises means for sending a positive answer detection signal verifying completion of the telephone call, and said telephone further comprises microphone enabling means for enabling a microphone in response to receipt of said answer detection signal.

18. A system as claimed in claim 1, wherein said tones are DTMF tones.

19. A system as claimed in claim 1, wherein said tones are inaudible high frequency tones.

20. A system as claimed in claim 1, wherein said control switch device further comprises automatic number identification means for automatically identifying the telephone number of said telephone, and means for verifying whether the number dialed is a number permitted from said telephone number.

21. A telephone call security system, comprising:
a control switch device including means for permitting access from a telephone to a restricted access carrier and means for generating and transmitting a coded sequence of tones;
a telephone including means for receiving said coded sequence of tones, generating a reply sequence of tones derived from but different than the coded sequence of tones, and transmitting said reply sequence of tones to said control switch device, said control switch device further including means for receiving said reply sequence of tones and determining whether said reply sequence of tones is a valid reply sequence of tones.

22. A system as claimed in claim 21, wherein said coded sequence of tones is a random selected of tones.

23. A system as claimed in claim 21, wherein said control switch further comprises timer means for generating a signal representative of the passage of a predetermined time interval, means for verifying whether said reply sequence of tones is valid, and means for disconnecting the telephone call if a valid reply sequence of tones is not received within said time interval.

24. A system as claimed in claim 23, wherein said control switch further comprises means for repeatedly generating coded sequence of tones and verifying reply sequence of tones prior to disconnection.

25. A system as claimed in claim 23, wherein said control switch device further comprises means for completing the telephone call if said reply sequence of tones is valid.

26. A system as claimed in claim 21, wherein said control switch device further comprises means for sending a positive answer detection signal verifying completion of the telephone call and said telephone further comprises microphone enabling means for enabling a microphone in response to receipt of said answer detection signal.

27. A system as claimed in claim 21, wherein said tones are DTMF tones.

28. A system as claimed in claim 21, wherein said tones are inaudible high frequency tones.

29. A system as claimed in claim 21, wherein said control switch device further comprises automatic number identification means for automatically identifying the telephone number of said telephone, and means for verifying whether the number dialed is a number permitted from said telephone number.

30. A telephone call security system control switch device, comprising
means for receiving a signal representative of a telephone identification number from a telephone;
means for verifying whether said telephone identification number is valid;
coded signal generating means for generating and transmitting to said telephone a coded sequence of tones subsequent to verification of whether said telephone identification number is valid;
means for verifying whether a reply sequence of tones received from said telephone in reply to said coded sequence of tones, said reply sequence of tones being different from said coded sequence of tones, is valid; and
means for routing a call from a telephone to a restricted access carrier upon verification that said identification number and said reply sequence of tones are both valid.

31. A switch device as claimed in claim 30, wherein said verification means comprises an identification data base and means for comparing said identification number with telephone identification numbers stored in said data base.

32. A switch device as claimed in claim 30, further comprising means for receiving a destination number from the telephone and for verifying whether said destination number is allowed from the telephone.

33. A switch device as claimed in claim 30, wherein said coded signal generating means includes means for generating and transmitting to said telephone said coded sequence of tones in response to receipt of said payment verification signal.

34. A switch device as claimed in claim 33, wherein said coded signal generating means comprises means for generating a random selection of tones.

35. A switch device as claimed in claim 34, wherein said control switch further comprises timer means for generating a signal representative of the passage of a predetermined time interval and means for disconnecting the telephone call if a valid reply sequence of tones is not received within said time interval.

36. A switch device as claimed in claim 35, wherein said control switch further comprises means for causing said coded signal generating means to periodically generate said coded sequence of tones and for causing said disconnection means to disconnect the telephone call if a valid response to a respective coded sequences of tones is not received within said predetermined time interval after the respective coded sequence of tones is generated.

37. A switch device as claimed in claim 30, wherein said tones are DTMF tones.

38. A switch device as claimed in claim 30, wherein said tones are inaudible high frequency tones.

39. A switch device as claimed in claim 38, wherein said control switch device further comprises automatic number identification means for automatically identifying the telephone number of said telephone, and means for verifying whether the number dialed is a number permitted from said telephone number.

40. A telephone, comprising:
 means in said telephone for generating and transmitting signals from said telephone to a control switch device representative of an identification number of the telephone;
 means for receiving and decoding a coded sequence of tones received from said control switch device after said identification number of the telephone has been generated and transmitted;
 means for deriving from the decoded coded sequence of tones a reply sequence of tones which is different from the coded sequence of tones; and
 means for transmitting said reply sequence of tones to a control switch device in order to obtain access to a long distance carrier.

41. A telephone as claimed in claim 40, wherein said identification number generating means comprises a memory and a microprocessor.

42. A telephone as claimed in claim 41, wherein said memory comprises an EPROM.

43. A telephone as claimed in claim 42, wherein said microprocessor is a Z-80 microprocessor.

44. A method of preventing unauthorized access to a restricted access carrier, comprising the steps of:
 transmitting a telephone identification serial number from a telephone to an access switch which controls access to the carrier;
 transmitting a coded sequence of tones from the access switch to the telephone and permitting access to the carrier only if the telephone generates and returns a valid reply sequence of tones derived from but different than said coded sequence of tones and only if the serial number is that of an authorized telephone.

45. A method of preventing unauthorized access to a restricted access carrier, comprising the steps of:
 transmitting a coded signal including a coded sequence of tones from a carrier access switch to a telephone; and
 permitting access to the carrier only if the telephone generates and returns a valid reply signal including a second sequence of tones which are modified in respect to the coded sequence of tones received from the carrier access switch.

* * * * *